United States Patent [19]

Andersson

[11] Patent Number: 5,176,171
[45] Date of Patent: Jan. 5, 1993

[54] CHECK VALVE
[75] Inventor: Bo Andersson, Cambridge, N.Y.
[73] Assignee: Flomatic Corporation, North Hoosick, N.Y.
[21] Appl. No.: 780,096
[22] Filed: Oct. 17, 1991
[51] Int. Cl.⁵ .................................................. F16K 15/06
[52] U.S. Cl. ............................. 137/512.1; 137/512.2; 137/512.3; 137/512.5; 137/541
[58] Field of Search ............... 137/512.1, 512.2, 512.3, 137/512.5, 541

[56] References Cited
U.S. PATENT DOCUMENTS

| | | | |
|---|---|---|---|
| 919,036 | 4/1909 | Langer | 137/512.2 X |
| 976,010 | 11/1910 | Thompson | 137/512.2 X |
| 977,377 | 11/1910 | Donnelly . | |
| 1,031,754 | 7/1912 | Westaway | 137/512.2 X |
| 1,109,154 | 9/1914 | Thomas . | |
| 1,748,203 | 2/1930 | Brunelle | 137/512.1 |
| 3,378,029 | 4/1968 | Lee . | |
| 3,572,376 | 3/1971 | Pfeifer | 137/512.2 |
| 3,621,874 | 8/1970 | Murphy . | |
| 3,839,741 | 10/1974 | Haller | 137/512.2 X |
| 4,535,809 | 8/1985 | Andersson . | |
| 4,662,601 | 5/1987 | Andersson . | |
| 4,905,959 | 3/1990 | Andersson . | |
| 4,964,611 | 10/1990 | Andersson . | |
| 4,971,093 | 11/1990 | Andersson . | |

FOREIGN PATENT DOCUMENTS
190328 8/1965 U.S.S.R. ............................ 137/512.2

Primary Examiner—Robert G. Nilson
Attorney, Agent, or Firm—Heslin & Rothenberg

[57] ABSTRACT

A check valve includes an outer poppet therein having a central opening therein where the outer poppet is mounted on the internal lip within the body of a valve. The outer poppet is translatable relative to the inner lip and body and an inner poppet is mounted within the central opening of the outer poppet where the inner poppet is also translatable relative to the outer poppet and inner lip. A means for limiting the translation of the outer poppet relative to the internal lip and a means for limiting translation of the inner poppet relative to the internal lip allow the outer and inner poppet to extend between an open position and retracted position to allow improved flow area through the valve.

26 Claims, 5 Drawing Sheets

CHECK VALVE

BACKGROUND OF THE INVENTION

This invention relates to the field of valves, and more particularly, to a check valve capable of allowing increased fluid flow therethrough.

Check valves are typically used in situations where fluid is required to flow through a pipe in one direction, as pressure on the flow side of the check valve increases, and to prevent the flow of fluid in a reverse direction should the pressure on the flow side decrease. Accordingly, check valves operate as one-way valve allowing fluid to flow in one direction and preventing fluid from flowing in the reverse direction. Check valves are typically used in series with submersible water well pumps which pump fluid from a water well or sump which then flows through a check valve mounted downstream from the submersible pump. The check valve prevents backflow of pumped fluid into the submersible pump after pumping has ceased.

The advent of high capacity water volume submersible pumps has resulted in a need for larger check valves which accommodate increased fluid flow therethrough without suffering excessive pressure drops. Since high capacity pumps require large diameter piping for optimum fluid flow therethrough, check valves must also be capable of handling large amounts of fluid flow therethrough. However, because the space available within water well casings to accommodate check valves is limited, physical constraints are placed upon the design of check valves. For example, the outer diameter of the check valves is limited, at most, to the inside diameter of the water well casing less the space needed for the electrical power cable to operate the submersible pump. Therefore, the innards of the valve must allow for maximum fluid flow within the available outer diameter of the valve.

Conventional check valves utilize a single poppet within a body which allows for a 50% to 60% cross sectional area which is available for the flow of fluid therethrough, relative to the flow area of the pipe supplying fluid through the valve. Therefore, these conventional check valves result in a significant pressure drop in fluid flow across the valve thereby requiring additional pumping power from the submersible pump to achieve the desired head at points downstream from the check valve.

It is therefore an object of the present invention to provide a check valve which will significantly reduce the pressure drop across the check valve thereby requiring less pumping power from a submersible pump.

It is also an object of the present invention to provide an improved check valve which will maximize flow area therethrough without the necessity of increasing the outer diameter of the check valve.

SUMMARY OF THE INVENTION

The aforementioned objects and advantages may be achieved through implementation of the check valve in accordance with the principles of the present invention.

The valve includes a body which is configured to allow fluid flow therethrough, the body having an internal lip therein separating the body into an upper part and a lower part, an outer poppet having a central opening therein, the outer poppet has the internal lip as its seat and is translatable relative to the internal lip and body, an inner poppet mounted within the central opening of the outer poppet the outer poppet as its seat, the inner poppet being translatable relative to the outer poppet. The valve may also include a means for limiting translation of the outer poppet relative to the internal lip and means for limiting the translation of the iner poppet relative to the internal lip. The outer poppet may be ring shaped.

The valve may further comprise a means for biasing the inner and outer poppets towards a retracted position. Also, the valve may comprise a means for sealing the area between the outer poppet and the internal lip when the outer poppet is in a retracted position to prevent fluid from flowing between the outer poppet and internal lip and/or a means for sealing the area between the inner poppet and outer poppet when the inner poppet is in a retracted position. The valve may further comprise a means for limiting the rotation of the inner poppet and/or a means for limiting rotation of the outer poppet.

The means for limiting the translation of the outer poppet may comprise a retainer attached thereto. The means for limiting the translation of the inner poppet may comprise a rod connected to the inner poppet at one end and slidable within an aperture located within a brace within the body and having a shoulder at the opposite end thereof; the shoulder limits the translation of the rods through the aperture. The means for biasing the inner and outer poppets in a retracted position may include a spring operatively engaged to the body and inner poppet. The spring may be a coil spring mounted around the rod between the brace and shoulder of the rod. The means for sealing the area between the outer poppet and the internal lip may be include an O-ring and the means for sealing the area between the inner poppet and outer poppet may also include an O-ring. The means for limiting rotation of the outer poppet may include a vane protruding from the outer poppet, the vane contacting a stop fixed to the internal lip when the outer poppet rotates a certain amount. The means for limiting rotation of the inner poppet may include a vane protruding therefrom, the valve contacting a stop affixed to the outer poppet when the inner poppet rotates a certain amount.

BRIEF DESCRIPTION OF THE DRAWINGS

The invention together with all its improvements, advantages and features will be described in conjunction with the drawings in which.

DETAILED DESCRIPTION

Figure 1:
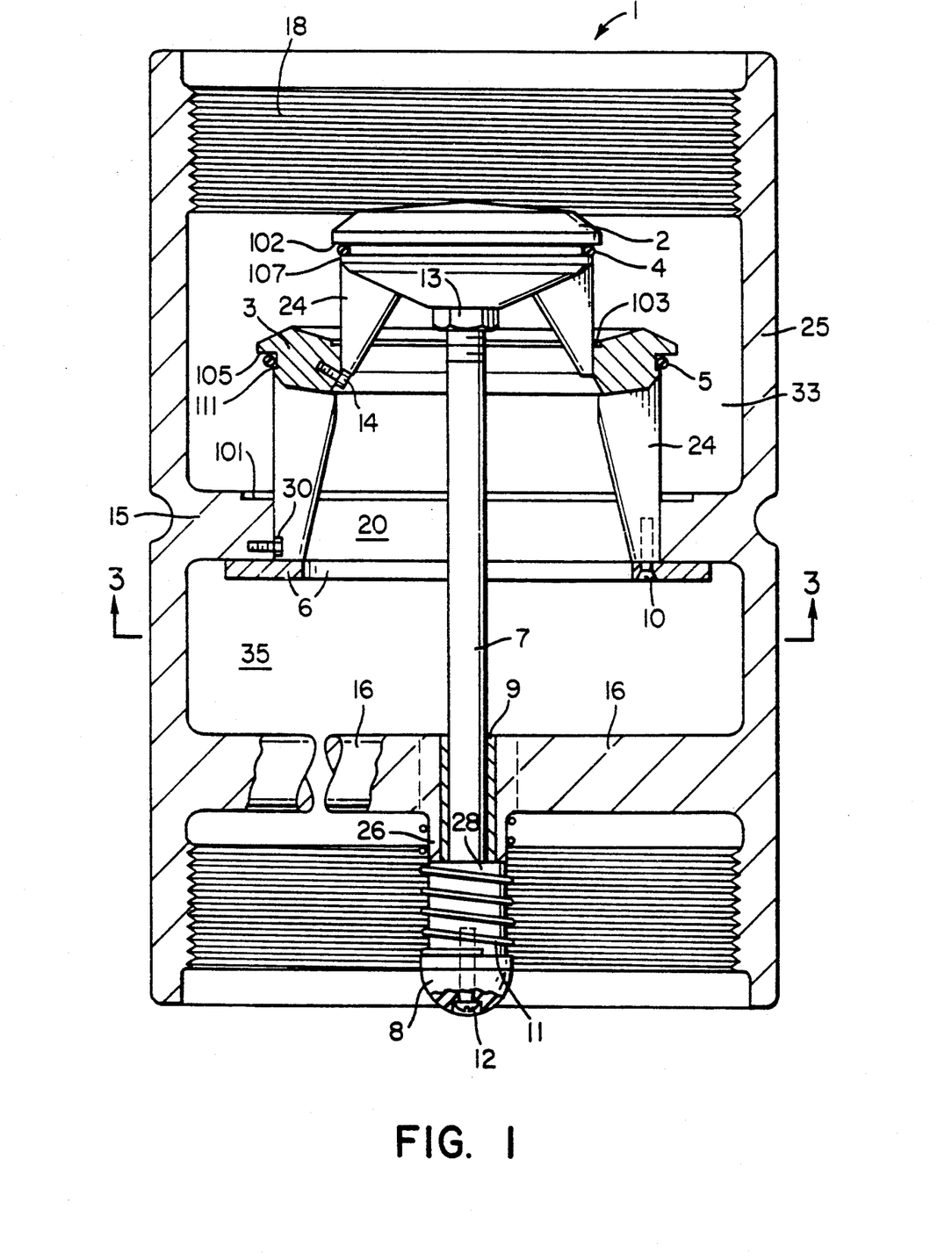
FIG. 1 is a sectional view of the check valve in accordance with the principles of the present invention as the inner poppet and outer poppets are in the extended position.

Referring to FIG. 1, the check valve contains a body having an internal lip 15, a ring shaped outer poppet 3, and an inner poppet 2.

The check valve body 1 is typically cylindrically shaped, and designed to be mounted in line within a piping network, similar to a coupling which is used to connect two lengths of pipe together. The body therefore may contain a means for securing a length of pipe to each end thereof such as threads 18 located at the axial ends of the body. Although threads are usually used as the engagement means for check valves, it is possible to mount check valves using conventional compression fitting techniques or the like. Within the body 1 an internal lip 15 protruding from the inner diameter of the body 1 forms an orifice or fluid flow opening 20. The internal lip 15 also effectively separates the body 1 of the valve into an upper portion 33 and lower portion 35. Typically the inner lip 15 is circular in shape as defined by its surface forming the fluid flow opening 20. However, the opening 20 is not limited to any particular geometrical shape. Nevertheless, description of the valve will be made in reference to a cylindrically shaped body and orifice opening, and reference will be made to the axial and radial directions relative to an imaginary central axis running parallel to the outer body wall 1.

Figure 2:
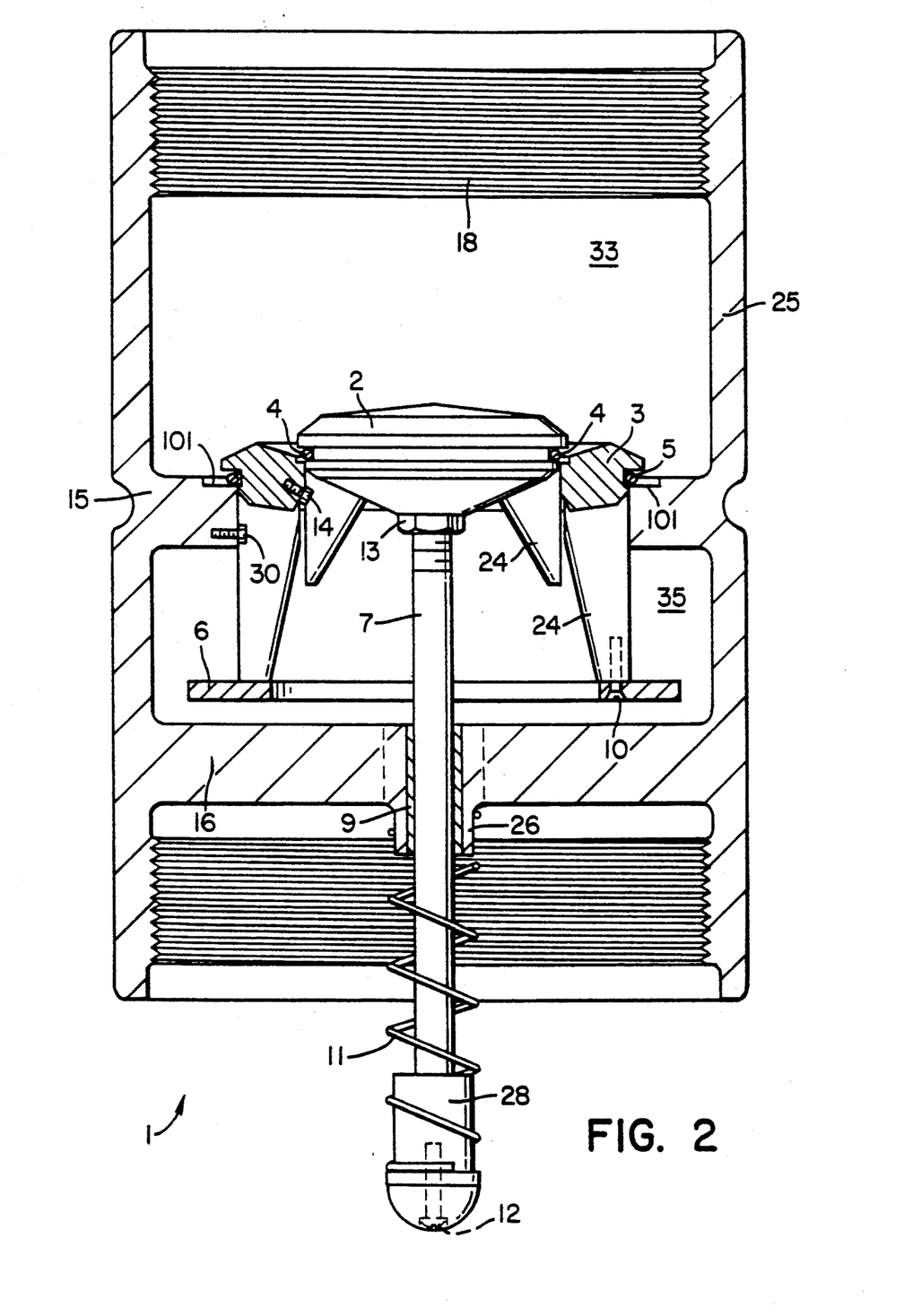
FIG. 2 is a sectional view of the check valve in accordance with the principles of the present invention as depicted in FIG. 1 where the outer and inner poppets are in the retracted position.

An outer poppet 3 is located within the body 1 and mounted within orifice opening 20 formed by the inner lip 15. A poppet is a valve that rises perpendicularly to or from its seat. The outer poppet 3 utilizes the inner lip 15 as its seat and is translatable in an axial direction perpendicular from the top 101 of the inner lip 15 which acts as a seat. When in the retracted position, as seen in FIG. 2, the outer poppet sits on the outer lip 15. The outer poppet contains one or more vanes 24 which extend in the axial direction from the upper portion 33 of the valve to the lower portion 35 substantially perpendicular to, or from, the top 101 of the inner lip. The vanes protrude from the lower surface of the outer poppet.

Figure 3:
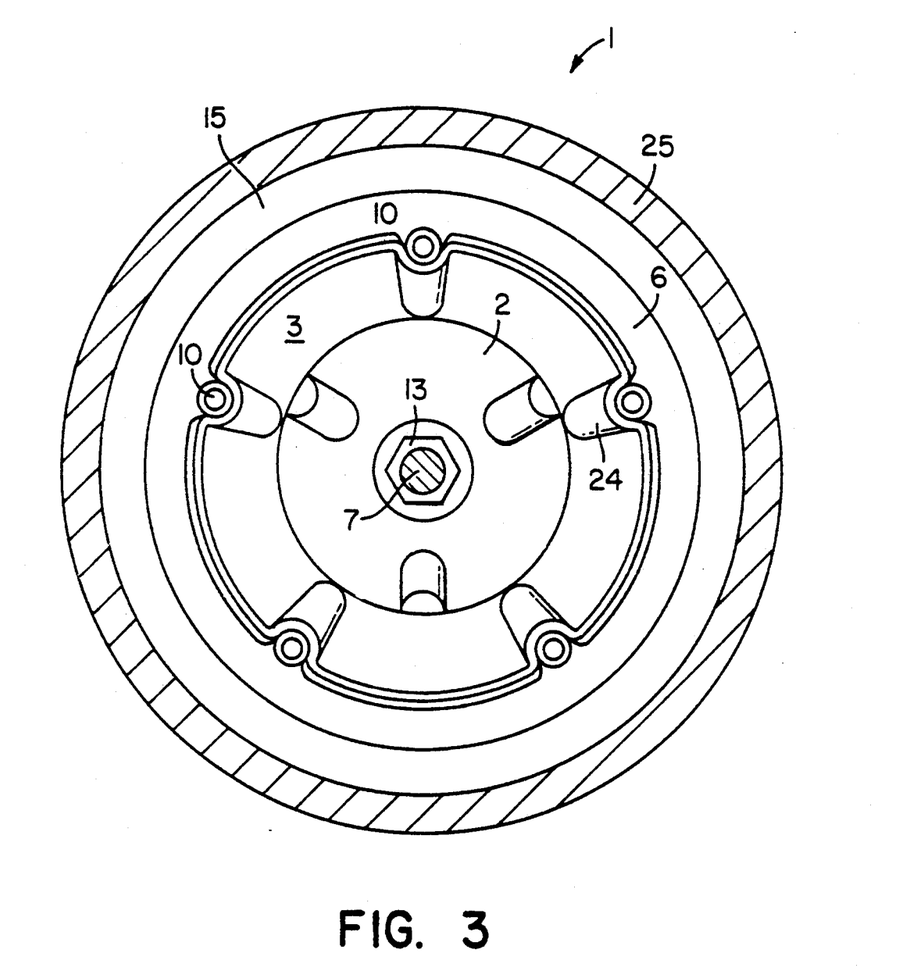
FIG. 3 is an axial view of the check valve depicted in FIG. 1 taken along line A—A.

A retainer 6, affixed to the lower ends of the vanes, acts as a means for limiting translation of the outer poppet relative to the internal lip 15. As shown in FIG. 3, the retainer 6 may be a ring affixed to the vanes by means of a screw 10, or other equivalent fastening means. The outer poppet vanes 24 are oriented to be slidable within the orifice opening 20 formed by the inner lip 15. The retaining ring 6 is located in the lower portion 35 of the body 1, below the inner ring 15, and extends radially to a diameter which is larger than the orifice opening 20 formed by the inner lip 15. As a result, the axial movement of the outer poppet 3 in an upwards direction is limited by the retainer ring 6. As shown in FIG. 1, the furthest extended position of the outer poppet 3 corresponds to the retainer ring's 6 contact with the underside of the internal lip 15. As a result, the translation of the outer poppet 3 in the axial direction is limited by the position of the retainer ring 6. Moreover, any radial movement of the outer poppet 3 is limited by the position of the outer poppet vanes 24.

The inner poppet 2 is also a valve that rises perpendicularly to and from a seat. The inner poppet 4 utilizes the outer ring shaped poppet 3 as its seat. The inner poppet 2 is capable of moving axially within the valve body perpendicular to the outer poppet 3 and inner lip 15. The inner poppet 2 is also preferably disk shaped to fit within the center opening of the outer ring shaped poppet 3. The inner poppet 2 contains vanes 24 which protrude from the lower portion thereof in a direction substantially perpendicular therefrom, substantially perpendicular to the inner lip 15 and axially relative to the side walls 25 of the body 1. The inner poppet vanes 24 limit radial movement of the inner poppet 2 by contacting the inner diameter of the outer poppet 3 at a certain position. Therefore, the inner poppet 2 is insured of remaining in the proper position during translation relative to the outer poppet 3 and when in the retracted position (FIG. 2).

A means for limiting the axial translation and position of the inner poppet 2 may include a rod 7 threadably engaged into a threaded aperture located within the underside of inner poppet 2. The rod 7 extends axially and substantially perpendicular from the inner poppet and in towards the lower portion of the body 1. The shaft 7 extends through an aperture located within a brace 16 which extends substantially radially across the lower portion of the body 1. The aperture contains a bushing 9 therein which facilitates the sliding of rod 7 therethrough. The brace 16 contains a collar 26 which extends perpendicularly from the main portion of the brace 16 and axially relative to the body 1. As shown in FIG. 2, the rod 7 has a shoulder 28 at the end of the rod opposite the threaded portion. The axial translation of the inner poppet 2 is limited by the location of the shoulder 28 on rod 7. As shown in FIG. 1, the inner poppet's extended position is defined by the contact between shoulder 28 and collar 26 such that inner poppet 2 may not extend to a position higher than that shown in FIG. 1.

A means for biasing the outer and inner poppets in a retracted position may include a coil spring 11. As shown in FIGS. 1 and 2, the spring may be mounted about rod 7. The rod 7 may contain a retaining means such as a dome 8 affixed thereto. The coil spring 11 may be mounted between the dome 8 retaining means and the brace 16 about rod 7. The coil spring 11 is a compression spring which should be slightly compressed when the poppets are in the retracted position shown in FIG. 2. This creates a bias on the poppets which maintains the poppets in the retracted position when fluid does not flow from the lower portion of the body to the upper portion. As shown in FIG. 1, when both poppets are in the extended or open position, the coil spring 11 is compressed, but preferably not compressed to a degree where the individual coils contact one another in order to minimize corrosion of the coil spring.

Figure 4:
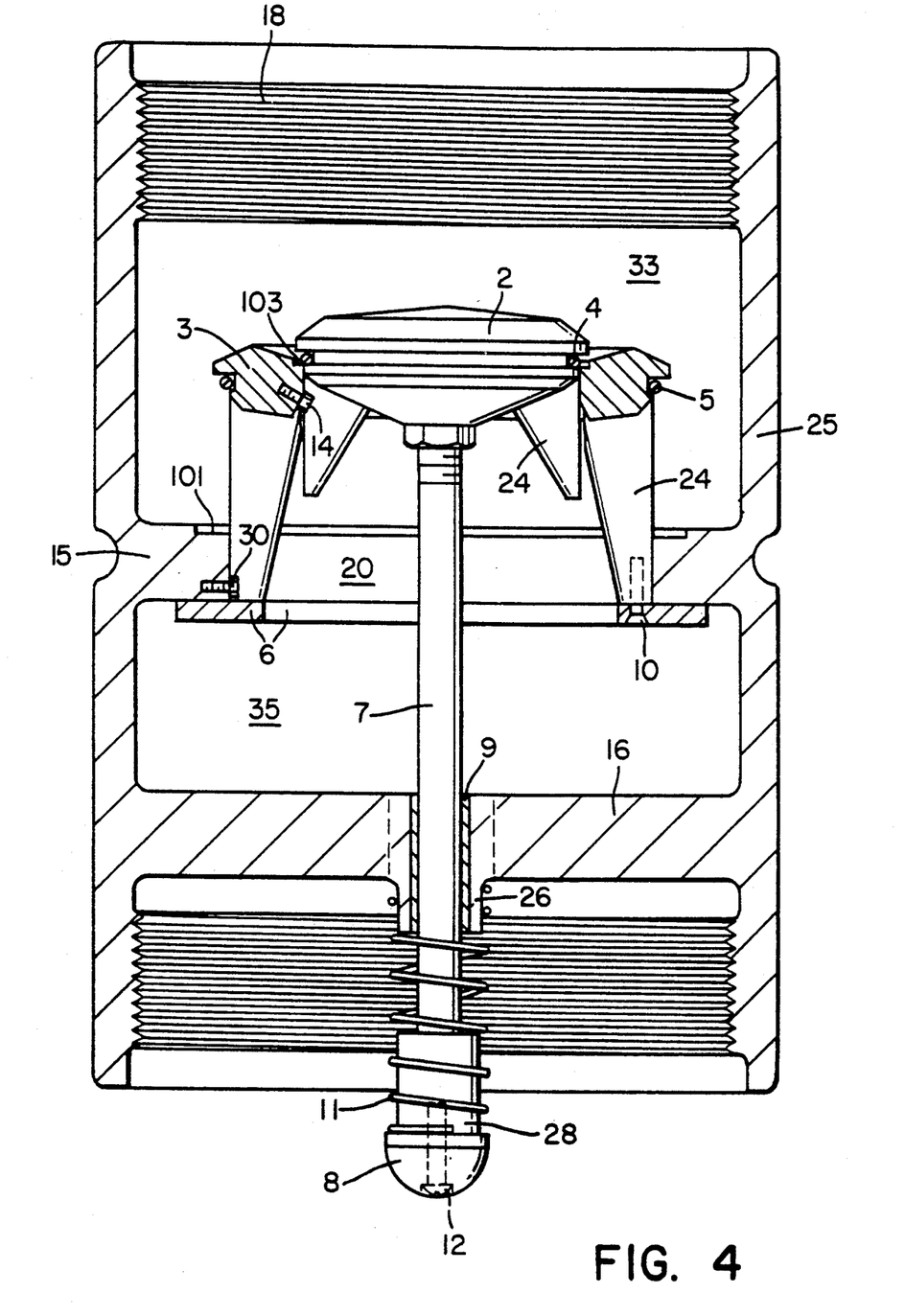
FIG. 4 is a sectional view of the check valve in accordance with the principals of the present invention as depicted in FIG. 1 where the outer poppet is in the extended position and the inner poppet sits on the outer poppet.

The threaded end of shaft 7 may contain a nut 13 thereon mounted below the inner poppet 2 to adjust the position of the inner poppet 2. This insures proper positioning of the inner poppet. The shaft 7 will therefore prevent the inner poppet 2 from overtranslation such that it will be removed from the inner portion of the outer poppet 3. The outer poppet 3 may be configured to provide sufficient contact with its seat, inner lip 15. Also, as shown in FIGS. 1 and 2, both the inner and outer poppets may be configured to receive a sealing means such as 0-rings 4, 5. The inner poppet 0-ring 4 functions as a seal between the inner poppet 2 and the outer poppet 3 when in a retracted position (FIG. 2 or FIG. 4). The outer poppet 0-ring 5 acts a seal between the outer poppet 3 and the inner lip 15 when the outer poppet is in the retracted position (FIG. 2). The outer poppet 3 contains a flange 105 on its underside where the 0-ring 5 is placed. The flange defines a portion of a groove 111 within which the O-ring 5 is placed. The O-ring 5 contacts the top portion 101 of the inner lip 15 which acts as a seat. Similarly, the inner poppet 2 contains a flange 107 which defines a groove 109 which receives the O-ring 4. When the inner poppet 2 is in the retracted position, such that its sits within outer poppet 3, the O-ring contacts a seat 103 formed at the upper inner diameter of the outer poppet 3.

Both the outer and inner poppets may be prevented from rotating within the housing by a means for preventing the rotation of the poppets. A cap screw 14, or other similar stop means, may be threaded into the inner diameter of the outer poppet 3 such that the vanes 24 extending from the inner poppet contact the screw 14 if the inner poppet 2 rotates to a certain position. Similarly, a screw 30, or other similar stop means, may be mounted within the inner lip 15 such that the screw 30 contacts the outer poppet vane 24 when the outer poppet is rotated to a certain position. Using screws mounted within the outer poppet and inner lip as stops, the rotation of the inner poppet and outer poppet, respectively, can be limited.

During operation, the poppets sequentially open when the pressure on the underside of the body increases to a degree where the force from the fluid pressure on the poppets causes the poppets to translate in the axial direction towards the upper portion of the body 1 thereby causing the coil spring 11 to compress. The poppets may be configured such that the surface area of the outer poppet 3 exposed to fluid flow from the lower portion 35 of the body 1 is greater than the surface area of the inner poppet 2 exposed to the same fluid flow from the lower portion of the body. In this situation, a greater force will be exerted on the outer poppet 3 such that the outer poppet will open first and the inner poppet 2 will continue to sit within the outer poppet 3, as is shown in FIG. 4. However, as fluid continues to be pumped through the valve the pressure may increase to a point where the inner poppet will further translate towards the upper portion 33 of the body 1 such that the inner poppet will rise from the surface of the outer poppet, as is shown in FIG. 1. In this position, fluid is allowed to flow between the outer poppet and inner lip 15 as well as between the inner poppet 2 and outer poppet 3. The result being that there is an increase in available fluid flow area for through the check valve when compared to conventional check valves.

The sequential opening of the valve provides for less hydraulic shocks in the piping system. The sequential opening will allow the larger poppet to open first and the inner poppet to subsequently open. When the poppets are in the fully extended position as shown in FIG. 1, coil spring 11 is compressed thereby applying a force upon the inner poppet in the axial direction towards the lower portion of the body 1. As the flow through the body of the valve decreases, the coil spring 11 will force the inner poppet to translate towards the retracted position and eventually the inner poppet 2 will sit within the outer poppet 3 and continue to translate both the outer poppet 3 and inner poppet 2 towards the completely retracted position shown in FIG. 2. The coil spring 11 may be designed to provide for quick closing of the poppets to prevent hydraulic shock to the piping network and pump.

The body of the check valve and the poppets may be fabricated of a ductile iron as is well known in the art. The O-rings are generally made of a Buna-n material while the rod, spring, and nut are generally made of a stainless steel material. The collar and bushing are generally made of bronze. The stops and any other screws or fasteners may be made of an anti-corrosive material such as stainless steel, brass, bronze or the like. Although, the materials typically used for construction of the valve have been set forth herein, it is apparent to one skilled in the art that various other materials may also be used and/or incorporated into the present invention, the invention is not limited to any particular type of material.

Although the invention has been described in conjunction with the embodiments depicted herein, it will be apparent to one skilled in the art that various changes, modifications and substitutions or the like may be made to these embodiments without departing, in any way, from the spirit of the invention. Any such modification, substitutions, changes or the like are intended to be within the scope of the invention as defined by the following claims.

What is claimed is:

1. A check valve to restrict the flow of fluid in a first direction comprising:
   a body configured to allow fluid to flow therethrough, said body having an internal lip therein separating the body into an upper part and a lower part;
   an outer poppet having a central opening therein, the outer poppet being within the body and having the internal lip as its seat, the outer poppet being translatable in a second direction relative to the internal lip and body;
   an inner poppet mounted without the central opening of the outer poppet, said inner poppet being translatable in the second direction relative to the outer poppet and having the outer poppet as its seat;
   means for limiting translation of the outer poppet relative to the internal lip;
   means for limiting rotation of the inner poppet;
   means for limiting translation of the inner poppet relative to the internal lip; and
   means for sequentially opening the poppets to allow fluid within the body to flow past the poppets in the second direction through the body wherein the poppets are opened by being translated in the second direction by pressure exerted by the fluid flowing through the body in the second direction.

2. The valve of claim 1 further comprising a means for biasing the inner and outer poppets towards a retracted position.

3. The valve of claim 1 further comprising means for sealing the area between the outer poppet and the internal lip when the outer poppet is in a retracted position to prevent fluid from flowing between the outer poppet and internal lip.

4. The valve of claim 3 wherein the means for sealing the area between the outer poppet and the internal lip comprises an O-ring.

5. The valve of claim 1 further comprising means for sealing the area between the inner poppet and outer poppet when the inner poppet is in a retracted position.

6. The valve of claim 4 wherein the means for sealing the area between the inner poppet and outer poppet comprises an O-ring.

7. The valve of claim 1 further comprising means for limiting the rotation of the outer poppet.

8. The valve of claim 7 wherein the means for limiting rotation of the inner poppet comprises a vane protruding therefrom, the valve contacting a stop affixed to the outer poppet when the inner poppet rotates a certain amount.

9. The valve of claim 1 wherein the means for limiting translation of the outer poppet comprises a retainer attached thereto.

10. A check valve to restrict the flow of fluid in a first direction comprising:
    a body configured to allow fluid to flow therethrough, said body having an internal lip therein separating the body into an upper part and a lower part;
    an outer poppet having a central opening therein, the outer poppet being within the body and having the internal lip as its seat, the outer poppet being translatable in a second direction relative to the internal lip and body;
    an inner poppet mounted without the central opening of the outer poppet, said inner poppet being translatable in the second direction relative to the outer poppet and having the outer poppet as its seat;
    means for limiting translation of the outer poppet relative to the internal lip, said means comprising a rod connected to the inner poppet at one end, said rod being slidable within the aperture located within a brace within the body and having a shoulder at the opposite end thereof, wherein the shoulder limits the translation of the rod through the aperture;
    means for limiting translation of the inner poppet relative to the internal lip; and
    means for sequentially opening the poppets to allow fluid within the body to flow past the poppets in the second direction through the body wherein the poppets are opened by being translated in the second direction by pressure exerted by the fluid flowing through the body in the second direction.

11. The valve of claim 10 wherein the means for biasing the inner and outer poppets in a retracted position comprises a spring operatively engaged to the body and inner poppet.

12. The valve of claim 11 wherein the spring is a coil spring mounted around the rod between the brace and the shoulder of the rod.

13. The valve of claim 1 wherein the means for limiting rotation of the outer poppet comprises a vane protruding from the outer poppet, said vane contacting a stop affixed to the internal lip when the outer poppet rotates a certain amount.

14. A check valve comprising:
    a body configured to allow fluid to flow therethrough, said body having an internal lip therein separating the body into an upper part and lower part;
    an outer poppet having a central opening therein, the outer poppet being mounted within the body on the internal lip and having the internal lip as its seat, the outer poppet being translatable relative to the internal lip and body;
    an inner poppet mounted within the central opening of the outer poppet and having the outer poppet as its seat, said inner poppet being translatable relative to the outer poppet;
    means for limiting translation of the outer poppet relative to the internal lip, said means comprising a retainer attached thereto;
    means for limiting translation of the inner poppet relative to the internal lip, said means comprising a rod connected to the inner poppet at one end, said rod being slidable through an aperture located within a brace within the body and having a shoulder at the opposite end thereof, wherein said shoulder limits the translation of the rod through the aperture;
    means for biasing the inner and outer poppets in a retracted position;
    means for sealing the area between the outer poppet and the internal lip when the outer poppet is in a retracted position to prevent fluid from flowing between the outer poppet and internal lip;
    means for sealing the area between the inner poppet and outer poppet when the inner poppet is in a retracted position.

15. The valve of claim 14 wherein the means for biasing the inner and outer poppets in a retracted position comprises a spring operating engaged to the body and inner poppet.

16. The valve of claim 15 wherein the spring is a coil spring mounted around the rod between the brace and the shoulder of the rod.

17. The valve of claim 16 wherein the means for sealing the area between the outer poppet and the internal lip comprises an O-ring.

18. The valve of claim 17 wherein the means for sealing the area between the inner poppet and outer poppet comprises an O-ring.

19. The valve of claim 18 further comprising means for limiting rotation of the outer poppet, said means comprising a vane protruding from the outer poppet, said vane contracting a stop affixed to the internal lip when the outer poppet rotates a certain amount.

20. The valve of claim 19 further comprising means for limiting rotation of the inner poppet, said means comprising a vane protruding therefrom, the value contacting a stop affixed to the outer poppet when the inner poppet rotates a certain amount.

21. The valve of claim 14 wherein the outer poppet is ring shaped.

22. A check valve mountable within a pipe for preventing fluid from flowing therethrough in a first direction comprising:
    a body configured to allow fluid to flow therethrough, said body having an internal lip therein separating the body into an upper part and a lower part;
    an outer poppet having a central opening therein, the outer poppet being within the body and having the internal lip as its seat, the outer popppet being translatable in a second direction relative to the internal lip and body;
    an inner poppet mounted within the central opening of the outer poppet, said inner poppet being translatable in a second direction relative to the outer poppet and having the outer poppet as its seat;
    means for limiting translation of the outer poppet relative to the internal lip;
    means for limiting translation of the inner poppet relative to the internal lip; and
    spring means operatively engaged to the inner poppet and body for maintaining the inner and outer poppets in a retracted position when the flow of fluid in the body in a second direction is below a predetermined pressure thereby preventing the flow of fluid through the body in the first direction and wherein the flow of fluid through the body in the second direction is facilitated when the flow of fluid in the second direction is above a predetermined pressure, the poppets being translated in the second direction by the pressure of the fluid flowing through the body in the second direction.

23. A check valve to restrict the flow of fluid in a first direction comprising:
 a body configured to allow fluid to flow therethrough, said body having an internal lip therein separating the body into an upper part and a lower part;
 an outer poppet having a central opening therein, the outer poppet being within the body and having the internal lip as its seat, the outer poppet being translatable in a second direction relative to the internal lip and body;
 an inner poppet mounted within the central opening of the outer poppet, said inner poppet being translatable in the second direction relative to the outer poppet and having the outer poppet as its seat;
 means for limiting translation of the outer poppet relative to the internal lip;
 means for limiting translation of the inner poppet relative to the internal lip;
 means for biasing the inner and outer poppets in a retracted position, said means comprising a spring operatively engaged to the body and inner poppet; and
 wherein the poppets may sequentially open to allow fluid to flow past the poppets in the second direction through the body, the poppets being opened in the second direction by pressure exerted by the fluid flowing through the body in the second direction.

24. The valve of claim 23 wherein the means for limiting translation of the inner poppet comprises a rod connected to the inner poppet at one end, said rod being slidable within an shoulder at the opposite end thereof, wherein said shoulder limits the translation of the rod through the aperture.

25. The valve of claim 24 wherein the spring is a coil spring mounted around the rod between the brace and the shoulder rod.

26. The check valve to restrict the flow of fluid in a first direction comprising:
 a body configured to allow fluid to flow therethrough, said body having an internal lip therein separating the body into an upper part and a lower part;
 an outer poppet having a central opening therein, the outer poppet being within the body and having the internal lip as its seat, the outer poppet being translatable in a second direction relative to the internal lip and body;
 an inner poppet mounted without the central opening of the outer poppet, said inner poppet being translatable in the second direction relative to the outer poppet and having the outer poppet as its seat;
 means for limiting translation of the outer poppet relative to the internal lip;
 means for limiting rotation of the outer poppet;
 means for limiting translation of the inner poppet relative to the internal lip; and
 means for sequentially opening the poppets to allow fluid within the body to flow past the poppets in the second direction through the body wherein the poppets are opened by being translated in the second direction by pressure exerted by the fluid flowing through the body in the second direction.

* * * * *

UNITED STATES PATENT AND TRADEMARK OFFICE
CERTIFICATE OF CORRECTION

PATENT NO. : 5,176,171
DATED : January 5, 1993
INVENTOR(S) : Bo Andersson

Figure 5:
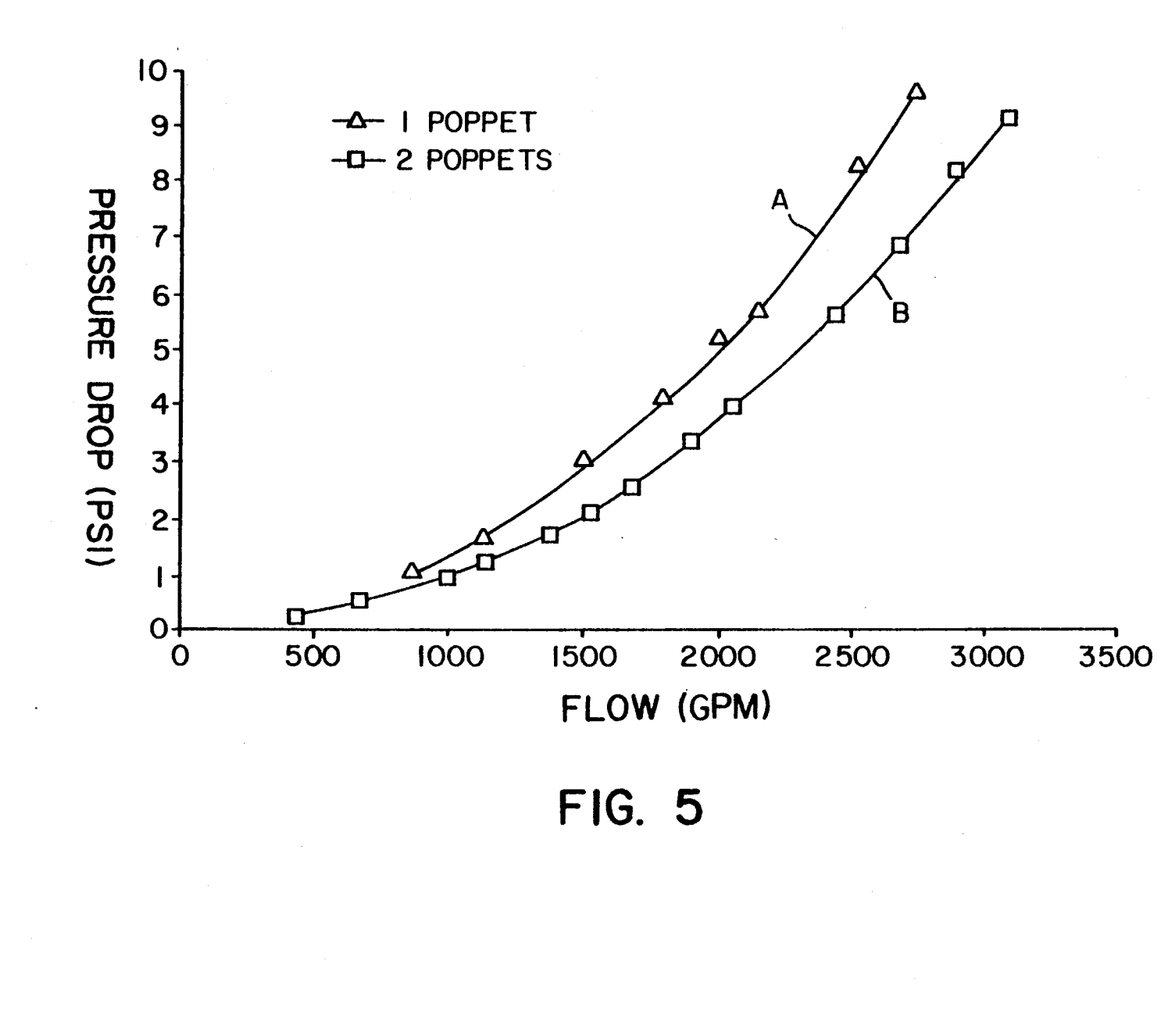

It is certified that error appears in the above-identified patent and that said Letters Patent is hereby corrected as shown below:

<u>In the Drawings</u>:

FIG. 5 should be deleted.

In claim 10, column 7, line 25, change "the" to --an--;

In claim 19, column 8, line 32, change "contracting" to --contacting--;

In claim 24, column 10, line 2, after "an" insert --aperture located within a brace within the body and having a--.

Signed and Sealed this

Second Day of November, 1993

Attest:

BRUCE LEHMAN

Attesting Officer     Commissioner of Patents and Trademarks